Patented Oct. 18, 1938

2,133,432

UNITED STATES PATENT OFFICE 2,133,432

COMPOUNDS OF THE PYRAZOLANTHRONE SERIES

Joseph Deinet, Milwaukee, Wis., assignor to E. I. du Pont de Nemours & Company, Wilmington, Del., a corporation of Delaware No Drawing. Application January 24, 1936, Serial No. 60,640

4 Claims. (Cl. 260—312)

This invention relates to new compounds of the pyrazolanthrone series and to the process for preparing the same.

German Patent 499,351 describes the preparation of acid wool dyestuffs of the pyrazolanthrone series which are prepared by diazotizing 1-amino-4-arylamino-anthraquinone-2-sulfonic acid, reducing the diazo compound to the hydrazine and then condensing to the corresponding pyrazolanthrone containing a sulfonic acid group in the 2 position. According to the patent the dyestuff dyes wool in reddish-brown shades.

I have found that 4-halogen-pyrazolanthrone can be condensed with arylamines of the benzene and naphthalene series to produce new compounds which on sulfonation give new and valuable acid wool dyestuffs, which dye in bright yellow and orange shades of good fastness to washing and kier boiling. These new compounds contain the sulfonic acid group in the aryl radical, and not in the anthraquinone nucleus.

Condensation of the halogen-pyrazolanthrone and the arylamine is effected by the process usually employed for the condensation of halogen-anthraquinone with amino compounds of the benzene or naphthalene series, the reaction being carried out in the presence of an acid binding agent such as an alkali metal carbonate or acetate. A copper catalyst may be employed if desired. The sulfonation of the resulting arylamino-pyrazolanthrone may be carried out in weak oleum (3 to 5%) at ordinary room temperatures. Where higher concentrations of oleum such as 20% or above are used, the temperature should not be allowed to go above about 50° C., for at elevated temperatures sulfonation of the anthraquinone nucleus may take place. The sulfonic acid compound may be isolated by drowning the mass in water and filtering. The cake may then be reslurried in water, neutralized, filtered and dried.

The following examples are given to more fully illustrate the invention. The parts used are by weight.

Example 1

300 parts of p-toluidine are heated to 60° C. under agitation, 60 parts of p-bromo-pyrazolanthrone and 30 parts of potassium acetate are added and the mass is then heated to 192° C. and held at this temperature for 3 to 4 hours. After cooling to 70° C., 300 parts of benzene are added and the mass is then further cooled to 25° C. and filtered. The cake is washed with benzene and dried. The dry product in powder form is suspended in 1000 parts of water, heated to 90° C., filtered, washed and dried. 50 parts of the dry powder are dissolved in 500 parts of 100% sulfuric acid at 18 to 20° C., 50 parts of 60% oleum are slowly added and the mass is stirred until sulfonation is complete. The melt is poured into 3000 parts of water and ice and filtered. The cake is suspended in 1000 parts of water and neutralized with 40% sodium hydroxide solution, filtered and dried.

The product dyes wool from an acid bath in very bright orange shades of very good fastness to washing.

Example 2

150 parts of aniline, 30 parts of p-bromo-pyrazolanthrone and 15 parts of potassium acetate are heated together to the boil and held for 4 to 5 hours. The melt is cooled to 80° C. and poured into 1000 parts of diluted hydrochloric acid, filtered, washed and dried. 25 parts of dry powder are dissolved in 250 parts of 100% sulfuric acid at 18 to 20° C. 25 parts of 60% oleum are slowly added and the mass is stirred for a short time. It is then worked up as in Example 1.

The product obtained dyes wool from an acid bath in orange shades of good fastness properties.

Example 3

300 parts of p-toluidine are heated to 60° C. Under agitation 60 parts of p-bromo-pyrazolanthrone and 30 parts of sodium carbonate are added. The mass is heated to 192° C. and held for 3 to 4 hours. It is then cooled to 70° C. and poured into 2000 parts of diluted hydrochloric acid, filtered, washed and dried. On sulfonating the product as in the preceding examples the same product is obtained as in Example 1.

When alpha-naphthylamine is substituted in place of the amines in the above examples, a compound is obtained which on sulfonation gives a product that dyes wool in orange shades somewhat redder than the corresponding toluidine compound. Ortho-chloro-aniline in the same process gives a product which dyes in orange shades somewhat more yellow than the anilido compound. Other substituted anilines and alpha-amino-naphthalenes may be substituted for those specifically mentioned above, provided, of course, the aryl radical is still capable of being sulfonated at ordinary or slightly elevated temperatures. The 4-chloro-pyrazolanthrone may be used in place of the 4-bromo compound specifically mentioned above.

I claim:

1. The process which comprises condensing a 4-halogen-pyrazolanthrone with an arylamine of the benzene and naphthalene series and sulfonating the resulting product at temperatures not above 50° C.

2. The process which comprises condensing 4-bromo-pyrazolanthrone with p-toluidine in the presence of an acid binding agent, sulfonating the resulting compound at ordinary room temperature, and isolating the product.

3. A sulfonated 4-arylamino-pyrazolanthrone in which the aryl radical is of the benzene and naphthalene series and in which the sulfonic acid group is in the aryl radical.

4. A sulfonated 4-p-toluido-pyrazolanthrone in which the sulfo group is in the benzene ring of the tolyl radical.

JOSEPH DEINET.